Sept. 4, 1928.  E. J. TE PAS  1,683,213

FLUID FUEL CONTROL SYSTEM

Filed July 12, 1926   2 Sheets-Sheet 1

INVENTOR.
Edmund J. De Pas

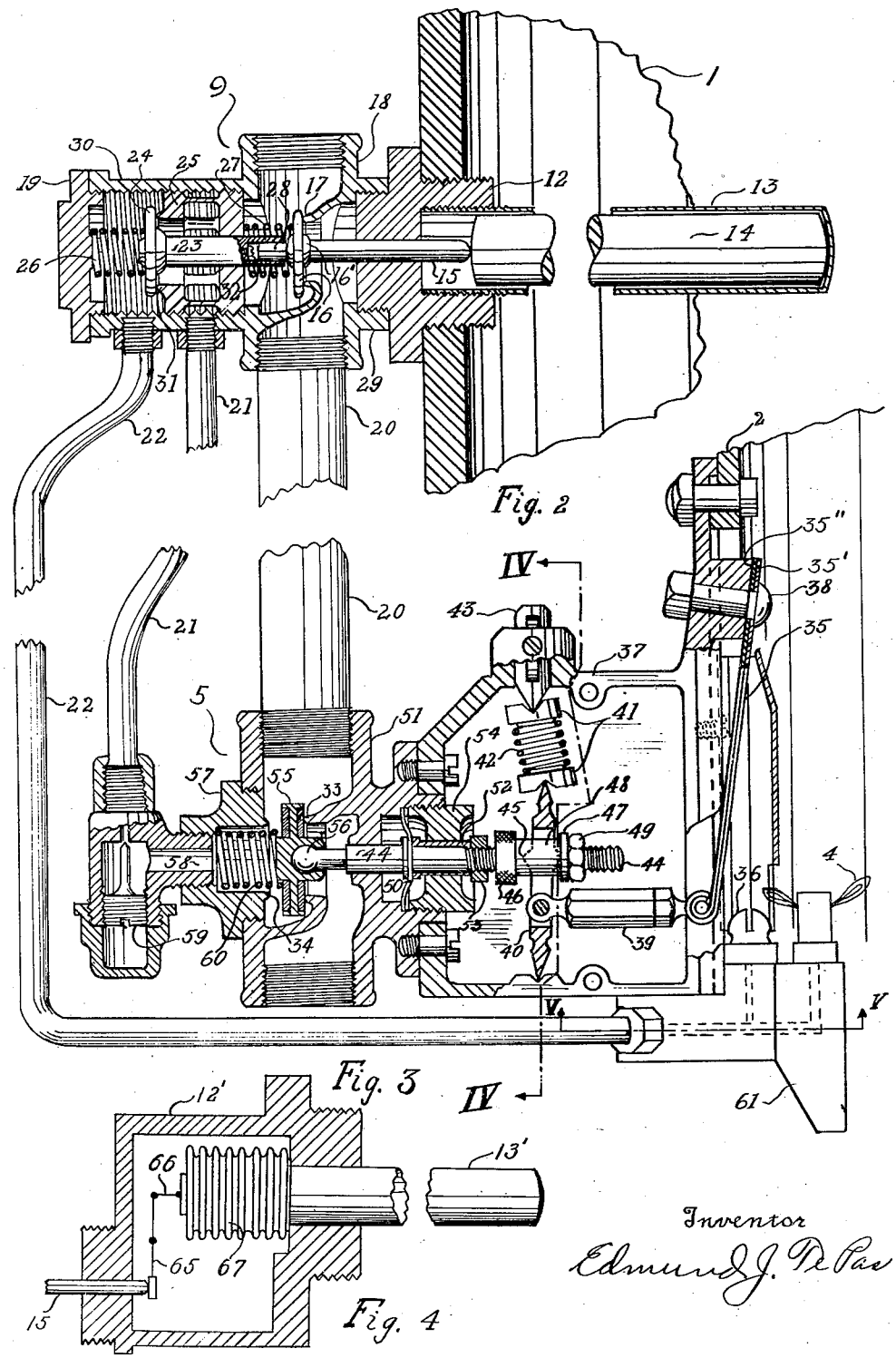

Patented Sept. 4, 1928.

1,683,213

UNITED STATES PATENT OFFICE.

EDMUND J. TE PAS, OF LAKEWOOD, OHIO, ASSIGNOR TO THE PATROL VALVE COMPANY, OF CLEVELAND, OHIO, A CORPORATION OF OHIO.

FLUID-FUEL-CONTROL SYSTEM.

Application filed July 12, 1926. Serial No. 121,910. REISSUED

This invention relates to gas fired water heaters and more particularly to that type of water heater employing a constantly burning pilot light for the ignition of gas supplied intermittently to a main heating burner.

The primary object of this invention is to provide a safe, positive and reliable means for controlling the flow and ignition of gaseous fuel to a heating burner.

Another object of this invention is to provide a fluid heater in which the temperature of the fluid automatically controls the flow of gaseous fuel to a pilot controlled thermally actuated valve.

A further object of this invention includes the provision of independent and distant control means for a heater of the type shown.

Figure 1:
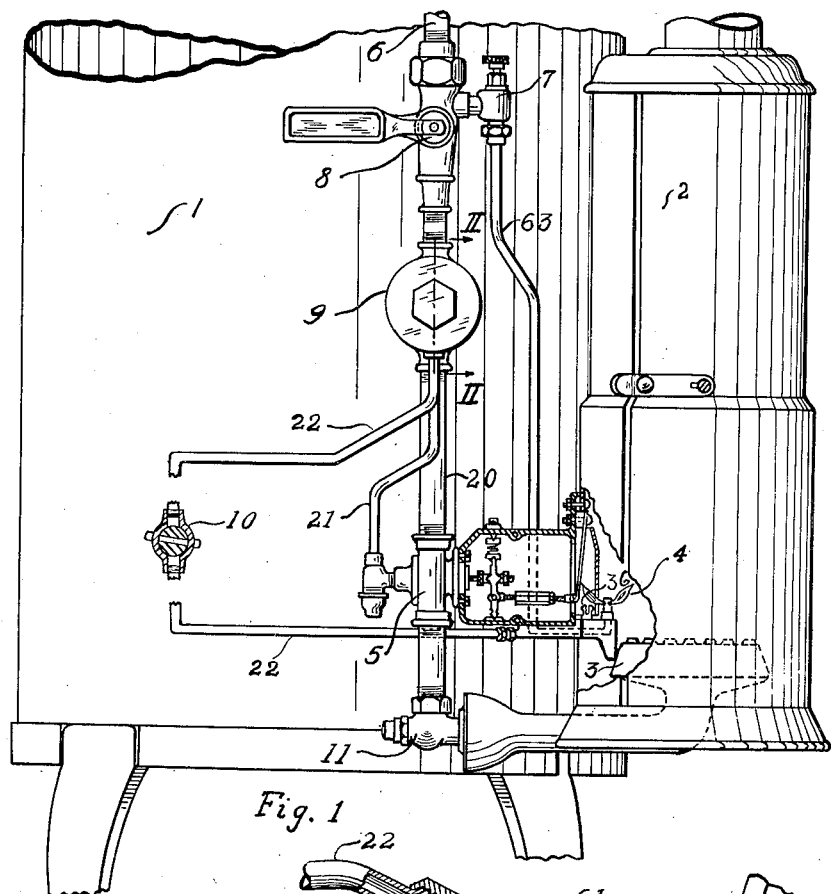
Figures 5, 6:
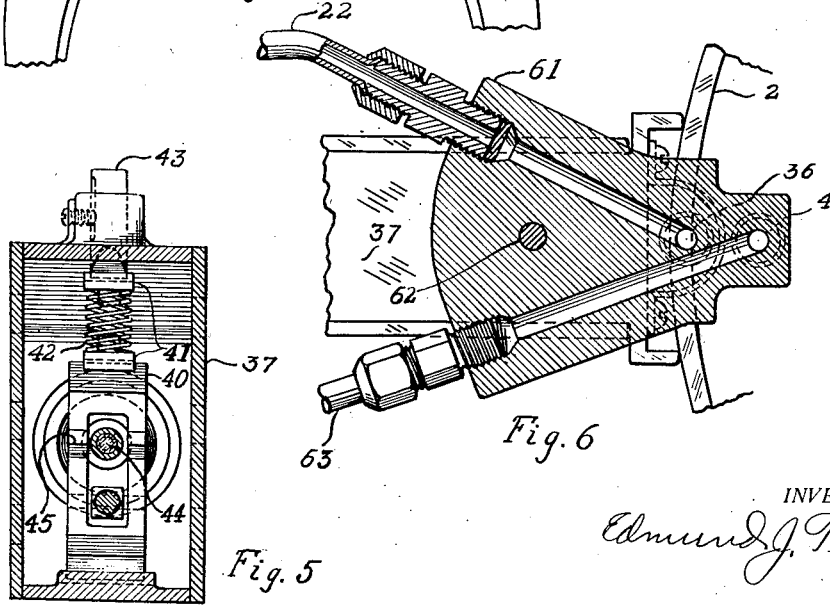

In the accompanying drawings which form a part of this specification, Figure 1 is an elevation partly in section of a storage automatic water heater provided with my improved fuel control; Figure 2 is a transverse section of the thermostatic valve taken on line II—II Figure 1; Figure 3 is an enlarged sectional elevation of the thermally actuated valve 5 shown in Figure 1; Figure 4 is an elevation partly in section and largely diagrammatical of a thermostat that may be used in place of the thermostat shown in Figure 2; Figures 5 and 6 are sections taken on lines IV—IV and V—V respectively of Figure 3.

Referring to the form of the device shown in Figure 1, the numeral 1 indicates a water storage tank provided with a heater of the side arm type. The numeral 2 refers to the casing of this heater in which are housed the usual water circulating elements in communication at their upper and lower ends with the corresponding parts of the tank 1.

A main gas burner 3 is supported in the bottom of the heater casing 2. Adjacent the main burner 3 is a constantly burning pilot 4 for igniting gas supplied to the main burner and also functioning in the operation of the thermally actuated valve 5 in a manner considered in detail in another part of this specification.

Gas is supplied to the main burner by a main feed line 6.

A needle valve 7 controls the flow of gas to the constantly burning pilot 4. The flow of gas to the burner 3 is controlled by four valves adjacent the burner in the feed line 6. These valves comprise a manually operable one way cock 8, a thermostatic valve 9 responsive to the temperature of the water in the tank 1, a thermally actuated valve 5 controlled by the thermostatic valve 9 and a distant control one way cock 10 and lastly a burner adjustment valve 11 of similar construction to the valve 59 shown in detail in Figure 3. The valves 7, 8, 10 and 11 are of conventional and well known design. The valves 9 and 5 however are to the best of my knowledge new in the art of gaseous fuel control and co-operate to produce a new and useful result. The thermally actuated valve 5 itself forms the subject matter of a separate application and is not specifically claimed in this one.

The thermostatic valve 9 shown in detail in Figure 2 is supported in the tank 1 by the threaded coupling 12. Extending from the coupling into the tank 1 and in contact with the fluid confined therein, is a thermostat of a well known type. This thermostat is made in the preferred form of a copper tube 13 adapted to be screwed into the coupling 12 and enclosing a rod 14 made of a material having a low coefficient of expansion such as porcelain or carbon. A valve stem 15 is journaled in the coupling 12 and is in contact at one end with the rod 14.

The differential expansion of the rod and tube 14 and 13 when subjected to temperature changes serves to actuate the valve stem 15. Attached to the valve stem 15 by means of a ball and socket joint 16' similar to the joint 56 in Figure 3, is a valve head 16. This valve head 16 co-operates with a seat 17 formed in the valve casing 18 to control the flow of fluid therethrough.

The valve casing 18 is provided with a pair of internally threaded lateral extensions 29 and 30 the first of which is adapted to receive the coupling 12 and the other extension 30 is adapted to form a housing for a secondary valve head 24 mounted on the valve stem 23 similarly to the mounting of the valve head 16 on its valve stem 15. A cap 19 forms a closure for the extension 30.

A partition element 25 is adapted to be screwed into the extension 30. This element 25 provides a guide and bearing for the valve stem 23, separates the casing 18 into two valve chambers and carries a valve seat 31 coacting with the valve head 24 to control the flow of gas between the tubes 21 and 22.

The valve heads 16 and 24 form a tandem or dual valve. An extension 28 of the valve stem 15 projects into the bored end of the valve stem 23 and is adapted to make contact with the adjustable screw 32 which furnishes a means of timing the opening of the valve head 24 relative to the valve head 16. A pair of springs 26 and 27 urge the valve heads towards the thermostat rod 14.

A system of compounding levers such as shown in Patents Number 610,281 and 682,345 to E. Ruud may be used in connection with the tube and rod 13 and 14 where a greater range of movement is required for the valve heads 16 and 12. Figure 4 also illustrates another manner of accomplishing the same object and in which 12' indicates the thermostat coupling and 15 the valve stem. This form of thermostat comprises a hollow tube 13' adapted to be secured to the coupling 12 and in contact with the fluid in the tank 1. An expansible-collapsible element 67 is secured to the tube 13'. The tube 13' and element 67 form a sealed fluid container. The expansion and contraction due to temperature changes of a fluid confined within this container actuates the element 67 and through the lever 65 and link 66 moves the valve stem 15.

Thermostat of this type having an expansible-contractible bellows such as 67, can be made giving a stroke of ¼ of an inch between the maximum and minimum working temperatures encountered in a water heating system of the type described.

As a means of preventing the admission of gas to the main burner at times when such admission might result in a dangerous condition, as for example when the pilot flame 4 is extinguished, a thermally actuated valve 5 is installed in the gas line 20 between the thermostatic valve 9 and the main burner 3. The active element of this valve is a bimetallic thermal element 35 which has the property of changing its shape from a straight line to an arc of a circle when subjected to the heat of a flame from the burner 36.

In the present instance the thermal element 35 is in the specific form of a flat narrow strip secured at its upper end to the housing 37 by a bolt 38. The lower or free end of the element 35 is connected to the adjustable link 39, connected to a vertically arranged oscillatable toggle acting member 40, the latter acting in conjunction with the spring resisted toggle acting elements 41 having the interposed spring 42. These toggle acting elements are removably and adjustably secured in position by means of the securing and adjusting pin 43. The toggle acting member 40 straddles an extension of the valve stem 44 and is adapted to form a lost motion connection between its contacting edges 45 and the annular projections 46 and 47 of the adjustable element 48 on the stem 44. The adjustable element 48 is held in position along the stem 44 by the locknut 49. A pliable packing diaphragm 50 is secured to the valve stem 44 and to the valve casing 51 by means of a flanged sleeve 52 and nut 53 and the threaded plug 54. A disc shaped valve head 55 is adjustably mounted on the end of the valve stem 44 by means of a ball and socket joint 56.

The valve head 55 is positioned between a pair of axially aligned valve seats 33 and 34 formed respectively in the valve casing 51 and the spring holder 57 and co-operates in controlling the flow of gas to the main burner 3 and the pilot burner 36 with the tandem valve 9. An adjustable needle valve 59 is located in the passage 58 to control the height of the flame of the burner 36. A spring 60 maintains contact between the edge 45 of the toggle member 40 and the annular projection 46 when toggle member 40 is to the left of its dead center position in Figure 3.

A pilot burner supporting block 61 is secured to the housing 37 by means of a bolt or screw 62 and is provided with passage ways to connect the constantly burning pilot flame 4 with its supply tube 63 and the burner 36 with its supply tube 22.

In the operation of the device the pilot 4 is first lighted and the valve 8 then opened admitting gas to the thermostatic valve 9. If the water in the tank 1 is below a predetermined temperature the thermostat will cause both the valve heads 16 and 24 to be in open position admitting gas to the thermally actuated valve 5. The valve 5 is normally in a closed position except when the main burner is in operation.

In the closed position of the valve 5 gas admitted to it passes to the valve actuating pilot burner 36 by way of passages 58, 21 and 22. This gas is ignited by the flame 4 and serves to heat the bimetallic strip 35 which is constructed of two metallic strips 35' and 35" that are bonded or welded to each other. In the present case the strip 35' is made of a metal having a high coefficient of expansion such as brass or monel metal and the strip 35" is made of a metal having a low coefficient of expansion such as Invar.

Upon the application of heat to the strip 35, the differential expansion of the two dissimilar metals 35' and 35" causes its free end to move to the left when viewed as in Figure 3. This movement of the strip 35 is communicated to the adjustable link 39 and the toggle acting members 40 and 41 which upon passing their dead-center position utilize part of the energy stored in the spring 42 to snap the valve head 55 away from its seat 33 by way of the valve rod 44 thus admitting gas to the main burner 3 which is ignited by the pilot 4.

Immediately after the opening of the valve 5, the valve head 55 is pressed against the seat 34 closing the passageway to the burner 36. The extinguishment of the flame from the burner 36 permits the strip 35 to cool and gradually return towards its former position. The spring 60 causes the valve head 55 and associated elements 44, 41, 40 and 39 to follow the movement of the strip 35 forming a graduating thermostatic valve with the seat 34. By these means, a regulated and controlled flow of gas is supplied to the burner 36 sufficient to keep the valve head 55 in the open position with respect to its seat 33 so long as gas is supplied to the valve 5 and the valve head 30 is in its open position.

As the temperature of the water is raised, the differential expansion of the thermostat element 13 and 14 allows the springs 26 and 27 to shift the valve heads 24 and 16 towards their seats. Further movement of the thermostat seats the valve head 24 cutting off the supply of gas to the burner 36 which allows the bimetallic strip 35 to cool and close the thermally actuated valve 5 cutting off the supply of gas to the main burner. In the event that the valve 5 does not close when the burner 36 is extinguished, continued heating of the water in the tank 1 will cause the tank thermostat to close the valve formed by the head 16 and seat 17 in the main feed line and shut off the supply of gas to the main burner. This secondary closure means is provided as a factor of safety positively to cut off the gas supply to the main burner should the thermally actuated valve 5 fail to function. Cooling of the water actuates the valve in a reverse manner, opening first the valve controlled by the head 16 and upon a further drop in temperature, the valve controlled by the head 24.

Under normal operating conditions the gas supply to the main burner is controlled by the tank thermostat with its valve head 24 and the thermally actuated valve 5. The valve head 16 comes into use only under abnormal conditions such as stated above.

The cycle of operations described contemplates the presence of the pilot flame 4. If for any reason this flame should be extinguished and the cock 8 be open, gas may be admitted to the valve 5 and a small amount by-passed from the valve 5 to the burner 36 by way of the passages 58, 21 and 22. In the absence of the flame 4 the small pilot burner 36 will not be ignited and the valve 5 will remain closed. It is apparent from the preceding that it is impossible to supply gas to the main burner unless the ignition flame 4 is burning.

The valve 10 provides a simple and effective means of controlling the heater from a distant point. In most installations the water heater is located in the basement and by extending the gas line 22 from the heater to the bathroom or kitchen and having a valve such as 10 located in the line 22 extended in these rooms, the heater can be put into or out of operation by opening or closing this valve, which provides a distant and manually operable control for the valve actuating pilot burner 36.

The valve 10 effects the operation of the thermally actuated valve 5 in the same manner as the thermostatic valve comprising the head 30 and seat 31. Thus closing the valve 10 cuts off the supply of gas to the burner 36 and upon extinguishment of the flame from this burner the valve 5 is closed in the manner previously described and the fuel supply to the main burner is cut off. Opening the valve 10 will permit the valve 9 to automatically control the operation of the heater in the manner described.

Furthermore, it is to be understood that the particular forms of apparatus shown and described, and the particular procedure set forth, are presented for purposes of explanation and illustration and that various modifications of such apparatus and procedure can be made without departing from my invention as defined in the appended claims.

I claim:

1. In a valve, a valve casing with passages arranged therein, a valve seat formed in said casing, a partition element providing a second valve seat and housed in said casing, a pair of tandem arranged valve heads coacting with said valve seats, and means to actuate the valve heads.

2. In a valve, a valve casing, a valve seat formed therein, a partition element providing a second valve seat and housed in said casing, a pair of valve heads coacting with said valve seats to control independent passages, and means to actuate the valve heads.

3. In a thermostatic valve, a valve casing, a valve seat formed therein, a partition element providing a second valve seat and separating the valve casing into two chambers, a pair of loosely coupled valve heads coacting with said valve seats to control a pair of independent passages, thermally actuated means to move first one valve and then the other to the open position, and resilient means to actuate the valve heads to their closed position.

4. In a fluid fuel control system, a thermally actuated valve to control the flow of fluid fuel, a valve actuating pilot burner, a constantly burning ignition pilot adjacent thereto, a dual valve having passages controlled by and leading from said dual valve to the thermally actuated valve and the valve actuating pilot burner, means to actuate the dual valve to first admit fuel to the thermally actuated valve when in its closed position and then admit fuel to the valve actuating pilot burner to open the thermally actuated valve.

5. In a fluid fuel control system, a thermally actuated valve to control the flow of fuel, a valve actuated pilot burner, a constantly burning ignition pilot adjacent thereto, a dual valve having passages controlled by and leading from said dual valve to the thermally actuated valve and the valve actuating pilot burner, means to actuate the dual valve to first admit fuel to the thermally actuated valve when in its closed position and then admit fuel to the valve actuating pilot burner to open the thermally actuated valve and means to cut off the supply of fuel to the valve actuating pilot burner to close the valve.

6. In a fluid fuel control system, a thermally actuated valve, a valve heating pilot burner, a constantly burning pilot burner adjacent thereto, and means for independently controlling the supply of fuel to the thermally actuated valve and the valve heating pilot burner.

7. In a fluid fuel control system, a main burner, a thermally actuated valve to control the flow of fuel to said main burner, a constantly burning pilot burner, a valve heating pilot burner adjacent thereto, and means independent of said valve to admit fuel to the thermostatic valve heating pilot burner to open said valve and supply fuel to the main burner.

8. In a fluid fuel control system, a main burner, a thermally actuated valve to control the flow of fuel to said main burner, a constantly burning pilot burner, a valve heating pilot burner adjacent thereto, and means independent of said valve to admit fuel to the valve heating pilot burner to open said valve and supply fuel to the main burner as long as the thermally actuated valve is heated.

9. In a fluid fuel control system, a main burner, a thermally actuated valve to control the flow of fuel to said main burner, a constantly burning pilot burner, a valve heating pilot burner adjacent thereto, and means independent of said valve to admit fuel to the valve heating pilot burner to open said valve and supply fuel to the main burner and means to cut off the supply of fuel to the valve heating pilot burner to close the valve and cut off the supply of fuel to the main burner.

10. In a fluid fuel control system, a main burner, a thermally actuated valve to control the flow of fuel to said main burner, a constantly burning pilot burner, a valve heating pilot burner adjacent thereto, means independent of said valve to admit fuel to the valve heating pilot burner to open said valve and supply fuel to the main burner, and means to cut off the supply of fuel to the valve heating pilot burner to close the valve and cut off the supply of fuel to the main burner and means to cut off the supply of fuel to the thermally actuated valve.

11. In a fluid fuel control system, a main burner, a thermally actuated valve controlling said main burner, a constantly burning pilot burner, an intermittently burning pilot burner adjacent thereto, means to independently admit fuel to the valve and to the intermittently burning pilot burner to open the thermally actuated valve and admit fuel to the main burner, and means to cut off the supply of fuel to the intermittently burning pilot flame to close the thermally actuated valve and cut off the supply of fuel to the main burner, and means to cut off the supply of fuel to the thermally actuated valve if said valve should fail to close.

12. In a safety fluid heating system, a fluid container, a main burner, a thermally actuated valve, a constantly burning pilot burner, a valve heating pilot burner adjacent thereto, means to supply fuel to the valve heating pilot burner to open the thermally actuated valve and admit fuel to the main burner when the temperature of the fluid falls to a predetermined limit, and means to cut off the supply of fuel to the valve heating pilot burner to shut off the supply of fuel to the main burner when the temperature of the fluid rises to a predetermined limit, and independent means to cut off the supply of fuel to the thermally actuated valve when the temperature of the fluid exceeds a predetermined limit.

13. In a constant temperature fluid heating system, a fluid container, a main burner to heat the contents of said container, a thermally actuated valve, a constantly burning pilot burner, a valve actuating pilot burner adjacent thereto, and means to independently supply gaseous fuel to the thermally actuated valve and the valve actuating pilot burner to open said valve and admit fuel to the main burner when the temperature of the fluid falls below a predetermined temperature.

14. In a constant temperature fluid heating system, a fluid container, a main burner to heat the contents of said container, a thermally actuated valve, a constantly burning pilot burner, a valve actuating pilot burner adjacent thereto, and means independent of said valve to cut off the supply of gaseous fuel to the valve actuating pilot flame to close the thermally actuated valve and extinguish the flame of the main burner when the temperature of the fluid rises above a predetermined temperature.

15. In a constant temperature safety fluid heating system, a fluid container, a main burner to heat the contents of said container, a thermally actuated valve, a valve actuating pilot flame adjacent thereto, and means to independently cut off the supply of fuel to the valve actuating pilot burner to close the valve and to the thermostatically actuated valve to doubly insure the cutting off of the fuel supply to the main burner to prevent the temperature of the fluid from becoming excessive.

16. In a safety gaseous fuel control system a main burner, a thermally actuated valve, a constantly burning ignition pilot, a valve actuating pilot burner adjacent thereto, and means to independently supply gas to the valve and the valve actuating pilot burner to open the thermally actuated valve and admit gas to the main burner, which is ignited by the constantly burning pilot.

17. In a burner control for a storage automatic water heater, a main heating burner and manually controlled temperature responsive means operable at a distance from said heater to control the flow of gaseous fuel to said main heating burner.

18. In a burner control for a fluid heater, the combination of a thermostatic gaseous fuel main supply valve, means to control the flow of fuel to said valve and distantly operable means independent of said first named means to control the flow of fuel from said thermostatic valve.

19. In a distant control for a gas-fired water heater, a main heating burner, a flame actuated thermostatic main supply valve to control the flow of gas to said burner and means operable at a distance from said heater to control said flame and consequently the thermostatic main supply valve and the fuel supplied by it to the main burner.

20. In a distant control for a gas-fired water heater, a main heating burner, a thermostatic valve, a gas flame to operate said thermostatic valve to control the flow of gas to said burner, a second thermostatic valve responsive to the temperature of the water in said heater to control the flow of gas to said first named thermostatic valve and said gas flame and means independent of said second thermostatic valve to control the flow of gas to said gas flame.

In testimony whereof I affix my signature.

EDMUND J. TE PAS.